United States Patent
Baradel et al.

[11] Patent Number: 5,764,230
[45] Date of Patent: Jun. 9, 1998

[54] WINDOW MANAGER SUITABLE FOR MULTIPLE WINDOW WORKSTATIONS

[75] Inventors: Christophe Baradel, Paris; Eric LeCaille, Chatillon, both of France

[73] Assignee: Cegelec, LeVallois Perret, France

[21] Appl. No.: 324,608

[22] Filed: Oct. 18, 1994

[30] Foreign Application Priority Data

Oct. 21, 1993 [FR] France ................................ 93 12569

[51] Int. Cl.⁶ .................................................. G06F 3/14
[52] U.S. Cl. ...................................... 345/346; 345/329
[58] Field of Search ........................... 395/157, 158, 395/160, 346, 340, 331, 356, 335; 345/119, 120, 346, 340, 331, 356, 335, 329

[56] References Cited

U.S. PATENT DOCUMENTS

| | | | |
|---|---|---|---|
| 5,073,933 | 12/1991 | Rosenthal | 345/333 X |
| 5,107,443 | 4/1992 | Smith et al. | 345/331 |
| 5,289,574 | 2/1994 | Sawyer | 345/332 |
| 5,379,374 | 1/1995 | Ishizaki et al. | 345/331 |
| 5,386,504 | 1/1995 | Yoda et al. | 345/340 |
| 5,408,602 | 4/1995 | Giokas et al. | 345/329 |

FOREIGN PATENT DOCUMENTS

0408391A2  1/1991  European Pat. Off. .

OTHER PUBLICATIONS

French Search Report FR 9312569.

*Primary Examiner*—Kee M. Tung
*Assistant Examiner*—Crescelle N. dela Torre
*Attorney, Agent, or Firm*—Sughrue, Mion, Zinn, Macpeak & Seas, PLLC

[57] ABSTRACT

A window manager for a windowing system includes a window server to command the display on screen of first windows reserved by client programs of the system. The window manager manages the disposition and the circulation of first windows within a second window reserved by the system. The server holds in memory a tree structure of windowing data on the basis of which the window server communicates with the screen window manager and with the client programs. This structure has a root defining the second window and nodes defining corresponding first windows. The window manager manages in the root a first list of identifiers of first windows and detects in each node the presence or the absence of control data. If control data is present in a node defining a particular first window, the window manager manages the disposition and the circulation of the first windows on the basis of second window data under the control of a client program.

4 Claims, 5 Drawing Sheets

WINDOW HIERARCHY

WINDOW HIERARCHY

WINDOW MANAGER SUITABLE FOR MULTIPLE WINDOW WORKSTATIONS

BACKGROUND OF THE INVENTION

1. Field of the Invention

The invention concerns a window manager for a windowing system including a window server for controlling the display on screen of first windows reserved by client programs of the system, the window manager managing the disposition and the circulation of the first windows within a second window reserved by the system.

2. Description of the Prior Art

A windowing system of this kind is routinely used in workstations which have graphics screens. The "XWindow" system is one widely used windowing system.

FIG. 1 shows a workstation comprising a processor 1, a graphics screen 2, a keyboard 3 and a pointing device 4 or "mouse". The "XWindow" windowing system comprises a window server 20 called "XServer" and a window manager 21 called "XWindowManager". It runs on the processor 1. The windowing system is used by two client programs 10, 11 conventionally called "IXClient". In the FIG. 1 example, the windowing system and the client programs of the system are resident in the same processor 1.

The client programs 10, 11, the server 20 and the manager 21 each have a library 40 of functions called "XLib" and use it to communicate with each other using a protocol defined in the Inter-Client Communications Manual ("ICCCM").

The server 20 communicates with the screen 2, the keyboard 3 and the mouse 4 through dedicated interfaces 30, 31, 32.

The "XWindow" windowing system is primarily designed to manage graphics output to the screen 2 by the client programs 10, 11. The client programs 10, 11 are therefore relieved of low-level screen management, which simplifies their design.

A client program of the windowing system reserves one or more areas 41, 42, 43 on the screen in which its graphic output is displayed. These, usually rectangular, screen areas are called "windows".

The windows are arranged by the windowing system, and a plurality of windows reserved by the same or different client programs can overlap partially or completely. All these windows are within a particular or "root" window which usually represents the background of the screen.

The windows reserved by the client program(s) are defined by a windowing data tree structure held in memory in the server, this data providing a basis for client program-server and server-manager communications.

This tree structure has a root which defines the root window reserved by the system and nodes which define the windows reserved by the client programs.

There is a hierarchical relationship between the root window and the windows reserved by the client programs. The latter can be "child windows" of the root window and are also known as "main windows" or "first level windows". A client program can also serve child windows of a main window, and so on. The former are then called "level 2 windows". The hierarchy of windows is defined by the tree structure.

FIG. 2 shows a hierarchy of windows f1 through f8 subordinate to the root window fr. In this hierarchy, the windows f1, f5, f6, f7 and f4 (for example) are reserved by a first client program. The window f2 is reserved by a second client program. The windows f3 and f8 are reserved by a third client. The windows f1, f2, f3, f4 are main or level 1 windows. The windows f5, f6 and f8 are level 2 windows.

FIG. 3 shows one example of the arrangement of the windows f1 through f8 inside the root window fr subject to the FIG. 2 hierarchy. In this figure the main window f1 of the first client program is covered by (under) the main window of the second client program. An "XRaise" function from the "XLib" library is used by the first client program to render its window f1 entirely visible so that the window f1 then covers (lies over) the window f2. Movement of the windows on the screen is known as "circulation". FIG. 4 shows a new hierarchy of the windows f1 through f8 and FIG. 5 shows a corresponding screen arrangement of the windows f1 through f8 after circulation of the window f1. An "XReparent" function from the "XLib" library is used by the first client program to modify the windows hierarchy, for example to attach the window f7 direct to the window f1. The window f7 then becomes a level 2 window. This movement of windows is known as "reparenting". FIG. 6 shows a new hierarchy of the windows fi through f8 and FIG. 7 shows a corresponding screen arrangement of the windows f1 through f8 after reparenting. In FIG. 7, window f7 is entirely covered by (under) the window f6.

The server 20 receives and executes windowing requests from a client program and the manager 21 manages the disposition and the circulation of main windows reserved by this client program in such a way as to share the root window optimally between the various main windows.

Referring to FIG. 8, the windowing system operates as follows: a first connection is set up between the client program and the server to create a main window f1. In other words, the client program 10 uses an "XCreateWindow" function XC to supply to the server 20 the windowing data for the window f1 relating to its identifier, its size, its position on the screen, etc. This windowing data is held by the server in a node 110 of the tree structure which has a root 100 defining the root window fr. The client program then uses an "XMapWindow" function XM to request the server to display the window fi it has just created. A second connection is set up between the server and the manager 21. The server advises the manager of the display request XM by sending it a "mapRequest" event mR. On receiving this event, the manager responds by modifying the windowing data defining the window f1, if necessary, and using the "XMapWindow" function XM sends back to the server a decision to display the window, if necessary on the basis of the modified windowing data. The server responds by displaying the window on the screen as defined by the manager, this window possibly covering part of, or even the whole of, another window already displayed on the screen.

In the context of an "XWindow" workstation, it is desirable for a client program to be able to request that critical information such as alarms should remain visible in the main window on the screen, notwithstanding the presence of other main windows reserved by other programs which could otherwise cover the window in question.

There is no provision in the "XWindow" system for a specific client program to impose on the manager a specific arrangement of the main windows in such a way as to keep a particular main window (that showing the critical information) entirely visible on the screen.

An object of the invention is to solve this problem. The invention is based on providing each client program of the windowing system with means for dynamic access to the windowing data held by the server and defining all of the main windows managed by the manager. Each client program can access in the tree structure only the windowing data of the root window and the windowing data of the main windows it has itself reserved. Access is based on the window identifier. On the other hand, the manager can access all the windowing data of all the main windows because it is advised of each and every request by a client program to display a main window.

SUMMARY OF THE INVENTION

The invention consists of a window manager for a windowing system including a window server adapted to command the display on screen of first windows reserved by client programs of the system, the window manager being adapted to manage the disposition and the circulation of first windows within a second window reserved by the system and the server being adapted to hold in memory a tree structure of windowing data on the basis of which the window server communicates with the screen window manager and with the client programs, said structure having a root defining the second window and nodes defining corresponding first windows, which window manager is adapted to:

a) manage in the root a first list of identifiers of first windows, b) detect in each node the presence or the absence of control data, c) if control data is present in a node defining a particular first window, manage the disposition and the circulation of the first windows on the basis of second window data under the control of a client program.

The invention has the following advantages:

For an existing "XWindow" type windowing system only the manager is modified.

The modified windowing system can be used by more than one client program at the same time, including commercially available programs such as spreadsheets, at least one of which is privileged in the sense that it has the facility to keep a main window that it has reserved entirely visible on the screen. Using the invention, an integrator client can compose an interface, including, for example, integrating windows of other kinds into its own man-machine interface.

The modification of the manager does not degrade in any way the standard operation of the windowing system.

The invention is described in detail hereinafter with reference to the appended drawings.

DETAILED DESCRIPTION OF THE PREFERRED EMBODIMENTS

Figure 1:
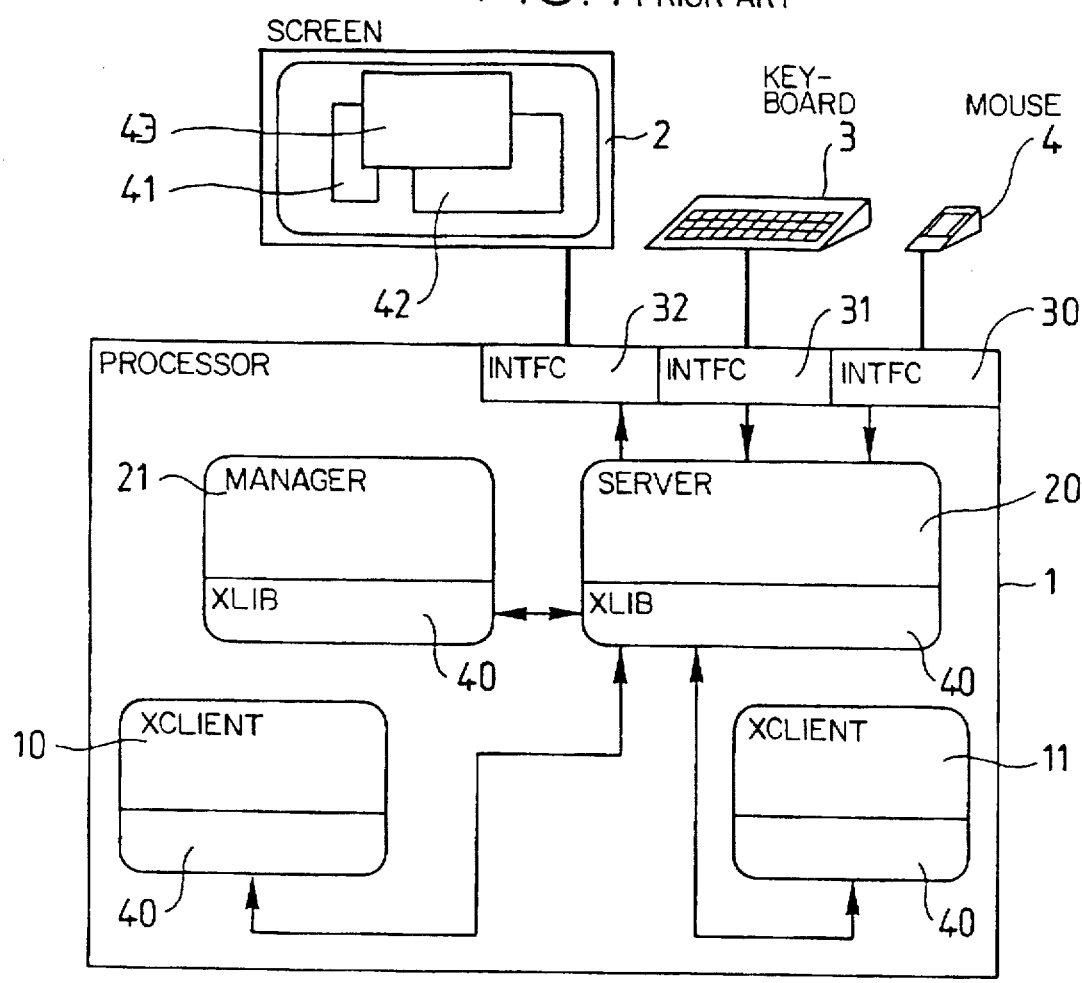
FIG. 1 is a diagrammatic representation of a prior art workstation using windowing.
Figure 3:
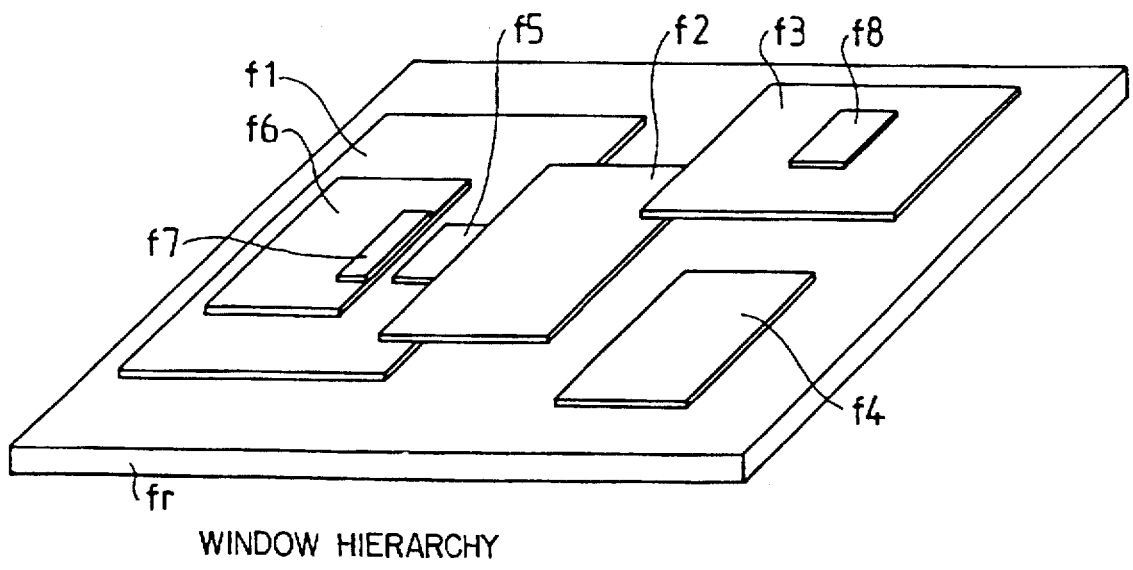
FIG. 3 shows the windows arranged on a screen with the FIG. 2 hierarchy.
Figure 2:
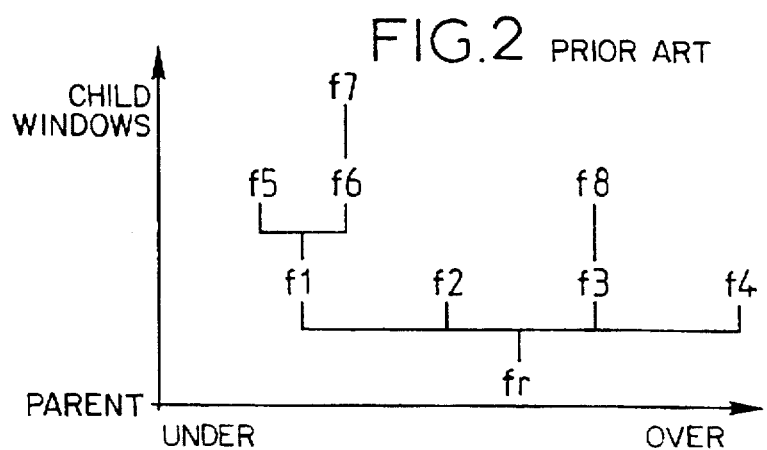
FIG. 2 shows a first hierarchy of windows.
Figure 4:
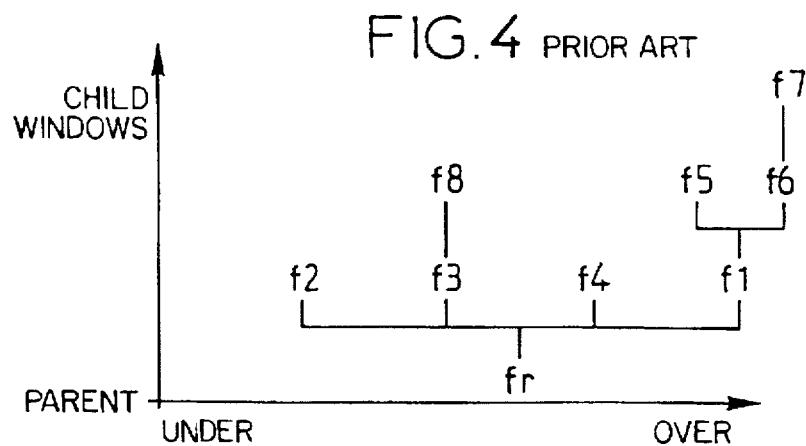
FIG. 4 shows a second hierarchy of windows.
Figure 5:
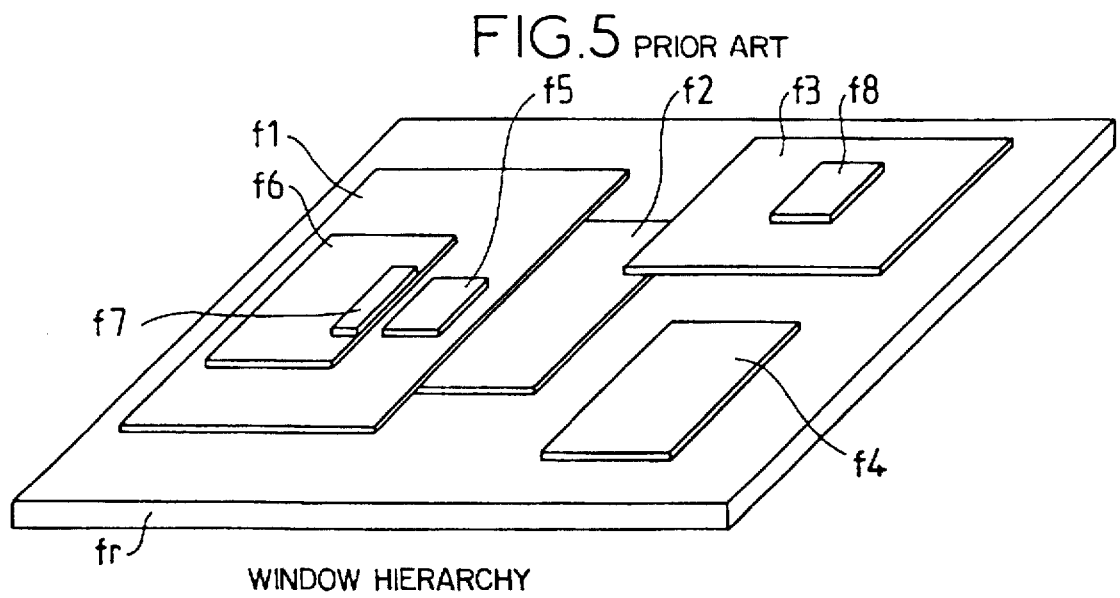
FIG. 5 shows the windows arranged on a screen with the FIG. 4 hierarchy.
Figure 6:
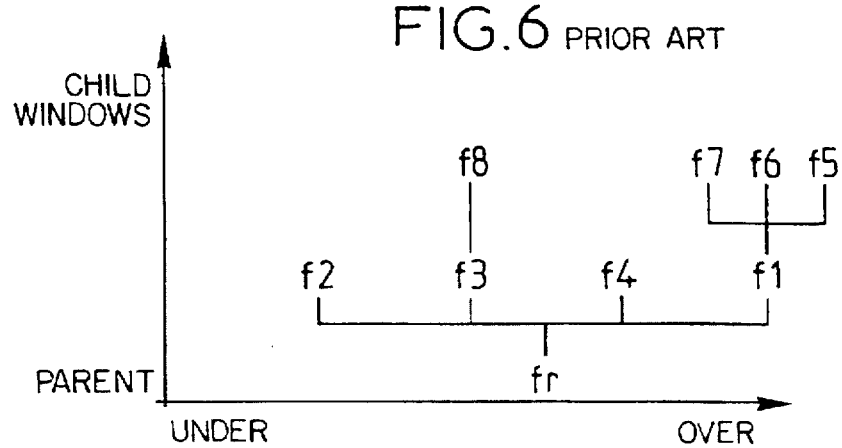
FIG. 6 shows a third hierarchy of windows.
Figure 7:
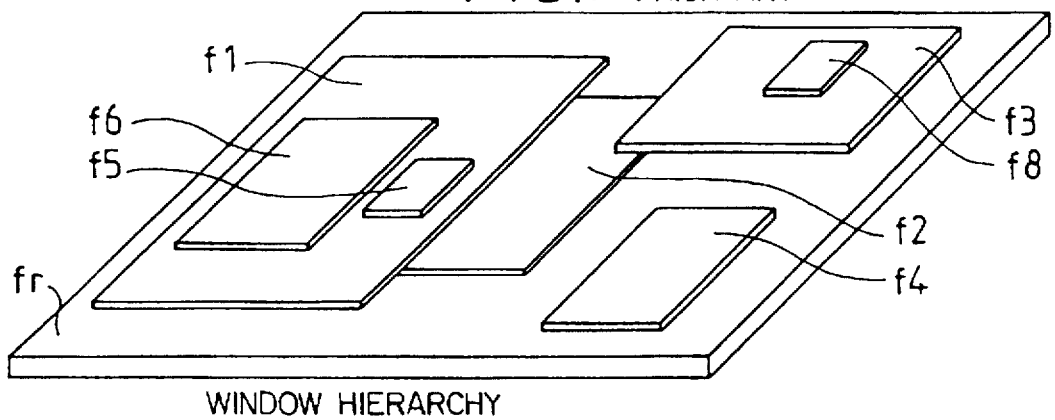
FIG. 7 shows the windows arranged on a screen with the FIG. 6 hierarchy.
Figure 8:
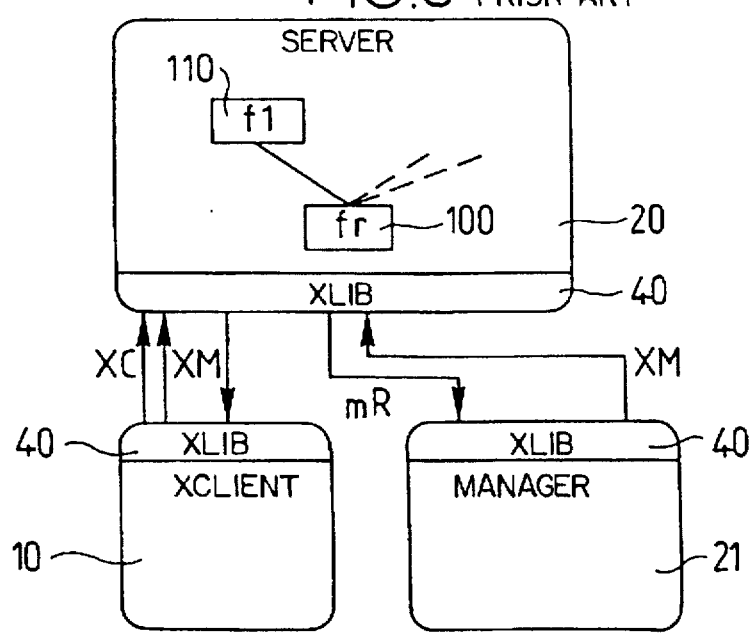
FIG. 8 shows how a prior art windowing system operates.
Figure 9:
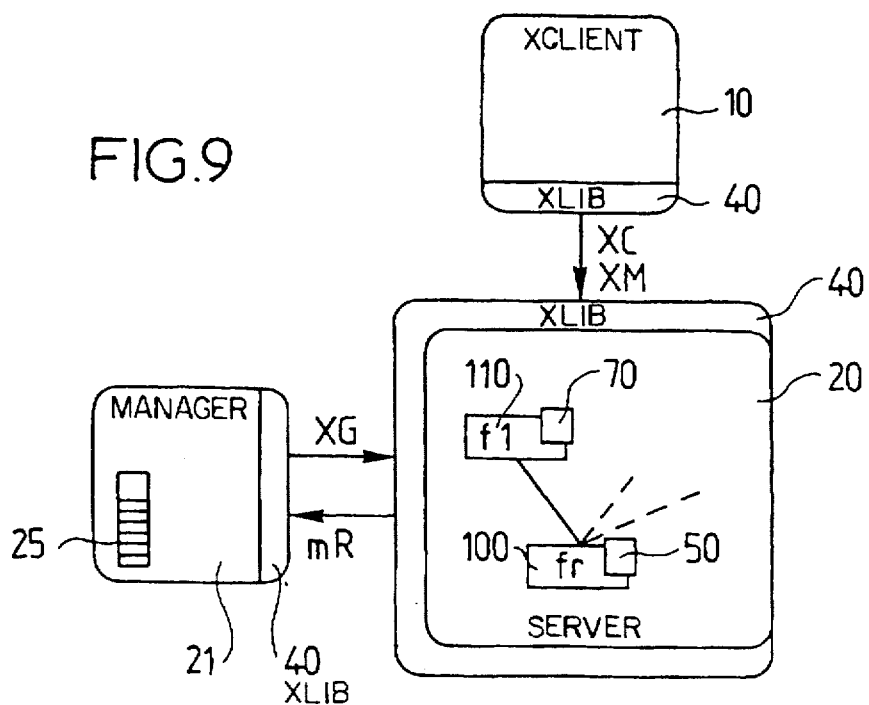
FIG. 9 shows a first example of the operation of the windowing system of the invention.
Figure 10:
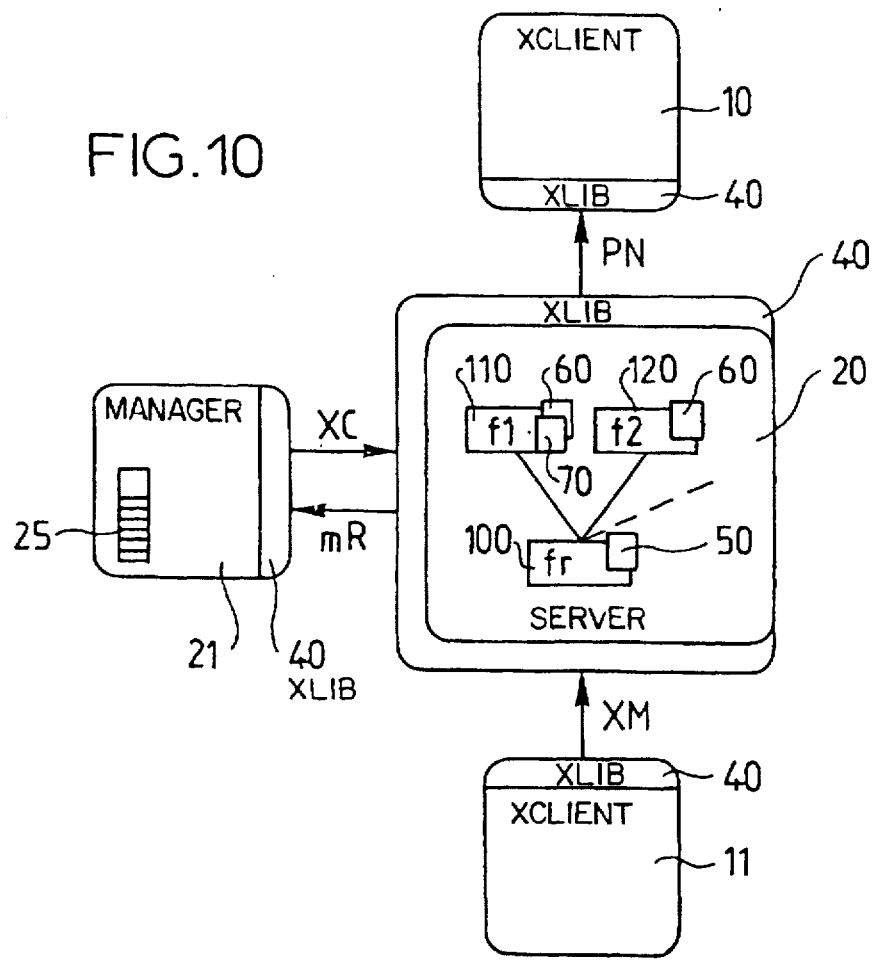
FIG. 10 shows a second example of the operation of the windowing system of the invention.

FIGS. 9 and 10 show a windowing system which is an "XWindow" system modified in accordance with the invention. It includes a standard server 20 and a modified manager 21. It is used by a client program 10 referred to hereinafter as the "integrator client". The integrator client reserves a main window f1 which must be entirely visible on the screen notwithstanding the presence of other main windows. The server communicates with the manager and the integrator client through the functions library 40. This example considers only one integrator client but the invention can be applied to the situation of a plurality of integrator clients using the windowing system at the same time.

The windowing system is modified as follows: the manager-integrator client communication protocol is extended. The manager is provided with a special identification mechanism, a mechanism for publication of main windows, a special mechanism for overloading main window attributes and a special mechanism for managing transients.

A—Extension of the communication protocol

Communication between the manager and the integrator client is based on the protocol defined in the ICCCM (standard "XWindow" mechanism: "Atoms", "Properties" and "ClientMessages").

The communication protocol is extended in the sense that the root 100 defining the root window fr includes a new property 50 accessible to any client program of the system. The atom of this new property 50 is called WM_WINDOWS. The new property 50 has a value of the "XWMWindows" type and a structure of the type defined as follows:

```
typedef struct {
  int count;
  Window wm_windows[];
}XWMWindows;
``` in which "count" is a variable for counting the number of main windows and wm_windows[] is a list of main window identifiers.

The protocol is further extended in that each node 110 defining a main window managed by the system includes a new property 60. The atom of this new property 60 is called WM_HINTS_OVERRIDE. The new property 60 has a value of the "XWMHintsOverride" type and a structure of the type defined as follows:

```
typedef struct {
  Window      delegate;
  char        title;
  char        move;
  char        close
  char        resize;
  char        circulate;
  char        iconify;
  char        normalOverride;
  Window      parent;
  int         x,y,width,height;
  char        mapped;
}XWMHintsOverride;
``` where:

"delegate" is a variable which contains the identifier of one of the main windows reserved by the integrator client (that used by the integrator/window manager identification mechanism) wishing to manipulate the main window concerned, "title" is a variable which tells the manager if the main window in question must have a title bar or not, "move" is a variable which tells the manager if the operator is authorized to display the main window in question interactively or not, "close" is a variable which tells the manager if the operator is authorized to close the main window in question interactively or not, "resize" is a variable which tells the manager if the operator is authorized to resize the main window in question interactively or not, "circulate" is a variable which tells the manager if the operator is authorized to circulate the main window in question or not, "iconify" is a variable which tells the manager if an icon must appear on the screen or not when the main window in question is closed, "normalOverride" is a variable indicating whether the main window in question must be managed in the usual way by the manager or not, "parent" is a variable which contains the identifier of the window designated as the parent of the main window in question, "x,y,width,height" are variables which tell the manager the imposed position and the imposed size of the main window in question, and "mapped" is a variable which tells the manager if the main window in question must be open or closed.

The protocol is further extended in that the node 110 defining a particular main window reserved by the integrator client also includes another property 70. The atom of this new property is called WM_DELEGATE. The new property has a Boolean type value, for example, and identifies the integrator client by means of one of its windows.

B—Identification mechanism

The object of this mechanism is to advise the manager of the presence of an integrator client. In FIG. 9 the specific client program 10 has reserved a main window f1 using the XC function ("XCreateWindow"). This client program next makes itself known to the window manager as an integrator client. The identification mechanism operates as follows:

The client program 10 places the property 70 "WM_DELEGATE" in the node 110 defining the window f1 using the XC function ("XChangeProperty"), and then requests the server to display this window using the XM function ("XMapWindow").

In response to the display request the server 20 sends a standard mR event ("maprequest") to the manager 21 to advise it that the window f1 is to be displayed.

In response to receiving this event the modified manager 21 looks up the windowing data of the node 110 using the XG function ("XGetWindowProperty") in order to detect whether the property 70 is present or absent. If the former, it inserts the identifier of the window f1 into a table 25 it holds in memory.

At this stage it is clear that a client program can become an integrator client dynamically, merely by placing the property 70 in a node defining a main window. This identification mechanism is triggered by the reception of an event indicating a change of property ("PropertyNotify") at a node or at the root of the structure. To receive any such event the manager must advise the server beforehand using the standard "XSelectInput" function.

C—Publication mechanism

The object of this mechanism is to tell the integrator client the identity of the main windows managed by the manager 21. Referring to FIG. 10, another client program 11 which is not an integrator client now uses the "XCreate" function to reserve a main window f2. The identification publication mechanism operates as follows:

The client program 11 uses the XM function ("XMapwindow") to request the server to display its window f2.

The server 20 sends an event mR to the manager 21 to advise it that a new main window must be displayed on the screen.

In response to reception of the event mR the modified manager 21 updates the value of the property 50 in the root 100 defining the root window fr using the XC function ("XChangeProperty"). The update involves incrementing the variable "count" and inserting the identifier of the window f2 into the list "wm_windows[]".

The server 20 sends a PN event ("PropertyNotify") to the integrator client to advise it that the property 50 had been modified.

D—Overload mechanism

The object of this mechanism is to add the property 60 in each node corresponding to a main window reserved by a client program of the server, including the integrator client. The overload mechanism operates as follows:

Referring to FIG. 10, in response to reception of the mR event the manger 21 adds the property 60 ("WM_HINTS_OVERRIDE") to the node 120 corresponding to the main window reserved by the client program 11. This property 60 is initialized by the manager with default values. Note that the manager carries out the same processing at the node 110 when the integrator client 10 reserves the main window f1.

Figure 11:
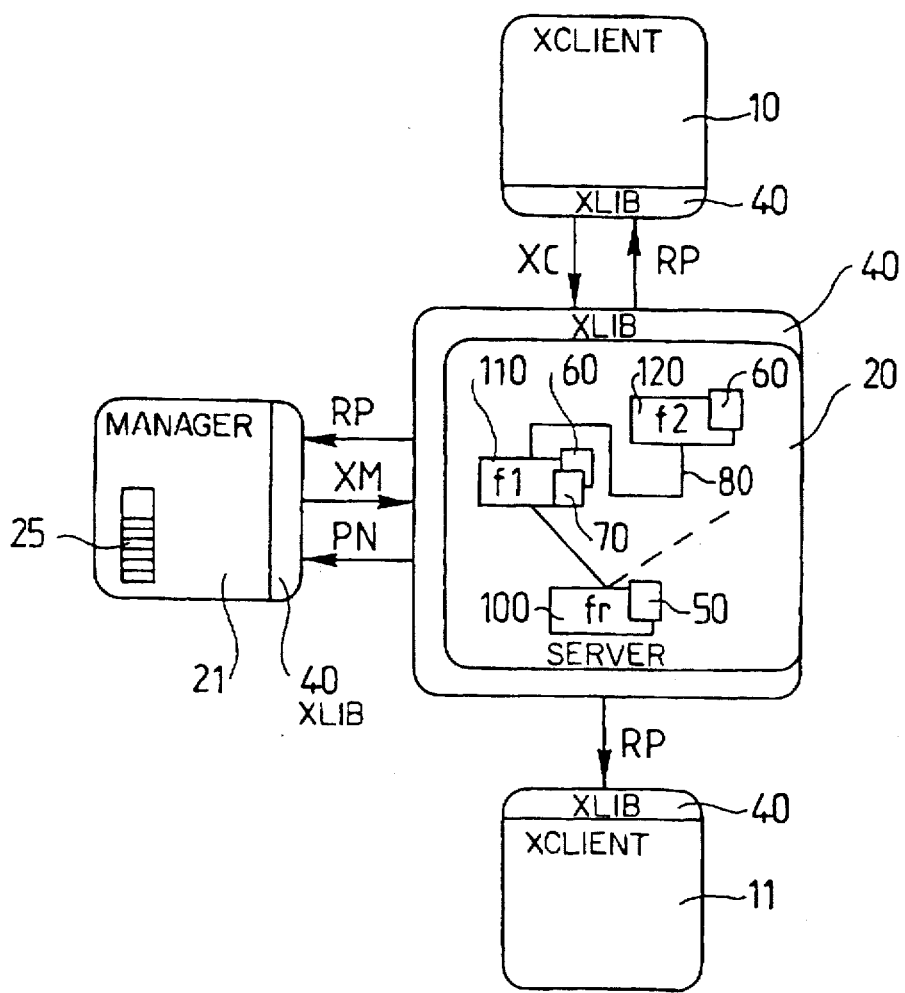
FIG. 11 shows a third example of the operation of the windowing system of the invention.

In response to the event PN the integrator client 10 looks up the property 50 in the root 100. It recovers the identifier of the window f2 which has just been reserved by the client program 11. At this stage (see FIG. 11) the integrator client can access the property 60 in the node 120. It sets the property 60 of the node 120 to values of its choice, for example to effect reparenting by modifying the "parent" variable indicated by the link 80, using the XC function ("XChangeProperty").

The server 20 sends a PN event ("PropertyNotify") to the manager to advise it that the property 60 of the window f2 has changed.

The manager takes note of the new values of the property 60 of the window f2 and sends the relevant display instruction to the server using the appropriate XLib function ("XMapwindow", "XReparentWindow", etc).

The server displays the window f2 whose configuration is set by the property 60. The server 20 sends RP events ("ReparentNotify", "ConfigureNotify" and/or "MapNotify") to the manager 21, to the integrator client 10 and to the client program 11 which have requested the server to advise them of changes to the window f2, using the "XSelectInput" function.

E—Transient management mechanism

When the window manager is started up it asks the server to send it a list of identifiers of main windows known to the server, using the "XQueryTree" function. In addition to its usual functions, the manager must search this list for all windows whose corresponding node includes the property 70 in order to update its table 25, to add the property 60 to each node corresponding to a main window and the property 50 in the node 100 associated with the root window.

When the window manager is stopped, it must delete the property 60 associated with the main windows and the property 50 associated with the root window and reorganize the main windows relative to the root window. Also, the integrator client is advised of stopping of the manager on receipt of the "PropertyNotify" event indicating deletion of the property 50.

To tell the manager that it is about to stop its integrator function, a client program must delete the property 70 which it had added to one or more main windows and wait for an event sent by the manager.

On receiving the "PropertyNotify" event associated with deletion of the property 70 the manager updates the windowing data of the windows under the control of the integrator client which set the property 70 and uses the "XLib" function "XSendEvent" to send a client event to the integrator client to tell it that it can stop (the message-type field of this event is the atom WM_DELEGATE).

There is claimed:

1. Window manager for a windowing system including a window server adapted to command the display on screen of first windows reserved by client programs of said system, said window manager being adapted to manage the disposition and the circulation of first windows within a second window reserved by said system and said server being adapted to hold in memory a tree structure of windowing data on the basis of which said window server communicates with said screen window manager and with said client programs, said structure having a root defining said second window and nodes defining corresponding first windows, said window manager comprising:

a) an identification mechanism for identifying a client program as an integrator client program, a client program which can integrate first windows generated by other client programs into its own windowing system by detecting, when said client program requests a display of a first window, a specific control data (70) set in the node of the tree structure corresponding to said first window, b) a publication mechanism for advising said integrator client program when at least one other client program requests a display of another first window, by storing an identifier (50) of said other first window in the root of the tree structure, c) and an overload mechanism for providing said tree structure with second windowing data (60) set to specific values under control of an integrator client program, said second windowing data being used for controlling disposition and circulation of said first windows into said second window.

2. Windowing system including a window manager for a windowing system including a window server adapted to command the display on screen of first windows reserved by client programs of said system, said window manager being adapted to manage the disposition and the circulation of first windows within a second window reserved by said system and said server being adapted to hold in memory a tree structure of windowing data on the basis of which said window server communicates with said screen window manager and with said client programs, said structure having a root defining said second window and nodes defining corresponding first windows, said window manager comprising:

a) an identification mechanism for identifying a client program as an integrator client program, a client program which can integrate first windows generated by other client programs into its own windowing system, by detecting, when said client program requests a display of a first window, a specific control data (70) set in the node of the tree structure corresponding to said first window, b) a publication mechanism for advising an integrator client program when at least one other client program requests a display of another first window, by storing an identifier (50) of said other first window in the root of the tree structure, c) and an overload mechanism for providing said tree structure with second windowing data (60) set to specific values under control of an integrator client program, said second windowing data being used for controlling disposition and circulation of said first windows into said second window.

3. Workstation comprising a display screen connected to a processor under the control of a windowing system including a window manager for a windowing system including a window server adapted to command the display on screen of first windows reserved by client programs of said system, said window manager being adapted to manage the disposition and the circulation of first windows within a second window reserved by said system and said server being adapted to hold in memory a tree structure of windowing data on the basis of which said window server communicates with said screen window manager and with said client programs, said structure having a root defining said second window and nodes defining corresponding first windows, said window manager comprising:

a) an identification mechanism for identifying a client program as an integrator client program, a client program which can integrate first windows generated by other client programs into its own windowing system, by detecting, when said client program requests a display of a first window, a specific control data (70) set in the node of the tree structure corresponding to said first window, b) a publication mechanism for advising an integrator client program when at least one other client program requests a display of another first window, by storing an identifier (50) of said other first window in the root of the tree structure, c) and an overload mechanism for providing said tree structure with second windowing data (60) set to specific values under control of an integrator client program, said second windowing data being used for controlling disposition and circulation of said first windows into said second window.

4. A window display management apparatus for controlling the display of windows generated by client programs, including integrator client programs, in a computerized windowing system, comprising:

a mechanism for identifying said client programs and receiving window control data associated with each of said client programs;

a mechanism for circulating and displaying said windows generated by said client programs;

an identification mechanism for detecting said integrator client programs, client programs which can integrate into their own windowing systems said windows generated by said client programs;

a publication mechanism for notifying said integrator client programs of the presence of said windows generated by said client programs; and an overload mechanism for allowing said integrator client programs to access and alter said window control data associated with each of said client programs.

* * * * *